(12) United States Patent
Pellenc

(10) Patent No.: US 8,813,370 B2
(45) Date of Patent: Aug. 26, 2014

(54) TRIGGER-OPERATED PORTABLE ELECTRIC TOOL

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 91 days.

(21) Appl. No.: 12/996,834

(22) PCT Filed: Aug. 19, 2009

(86) PCT No.: PCT/FR2009/001014
§ 371 (c)(1),
(2), (4) Date: Feb. 2, 2011

(87) PCT Pub. No.: WO2010/020720
PCT Pub. Date: Feb. 25, 2010

(65) Prior Publication Data
US 2011/0147026 A1 Jun. 23, 2011

(30) Foreign Application Priority Data
Aug. 22, 2008 (FR) .................................... 08 04679

(51) Int. Cl.
*B26B 15/00* (2006.01)
*A01G 3/037* (2006.01)
(52) U.S. Cl.
CPC ............... *A01G 3/037* (2013.01); *B26B 15/00* (2013.01)
USPC ................................. 30/228; 30/247; 30/249
(58) Field of Classification Search
USPC ................... 30/228, 249, 247, 197, 241, 194; 200/505; 335/205
See application file for complete search history.

(56) References Cited

U.S. PATENT DOCUMENTS

| | | | | |
|---|---|---|---|---|
| 3,693,254 A * | 9/1972 | Salonen | ............................ | 30/228 |
| 4,359,821 A * | 11/1982 | Pellenc | ............................ | 30/228 |
| 4,967,474 A * | 11/1990 | Wells | ................................. | 30/228 |
| 5,002,135 A * | 3/1991 | Pellenc | ............................ | 173/170 |
| 5,198,789 A * | 3/1993 | Taylor | ............................ | 335/132 |
| 5,261,162 A * | 11/1993 | Siegler | ............................ | 30/216 |
| 5,702,420 A * | 12/1997 | Sterling et al. | ................ | 606/205 |
| 5,867,909 A * | 2/1999 | Jeltsch et al. | ..................... | 30/228 |
| 6,260,423 B1 * | 7/2001 | Garshelis | .................. | 73/862.336 |
| 6,936,789 B2 * | 8/2005 | Hanzel | ............................ | 219/132 |
| 8,033,025 B2 * | 10/2011 | Maffeis | ............................ | 30/228 |
| 8,122,607 B2 * | 2/2012 | Maniwa et al. | .................... | 30/228 |
| 8,276,280 B2 * | 10/2012 | Lee et al. | ............................ | 30/228 |
| 2004/0055164 A1 * | 3/2004 | Molins | ............................ | 30/228 |
| 2007/0108944 A1 * | 5/2007 | Pellenc | ............................ | 320/130 |
| 2009/0241351 A1 * | 10/2009 | Maniwa et al. | .................... | 30/228 |
| 2010/0064527 A1 * | 3/2010 | Lee et al. | ............................ | 30/228 |
| 2010/0071218 A1 * | 3/2010 | Poole et al. | ....................... | 30/233 |
| 2010/0269355 A1 * | 10/2010 | Yang et al. | ........................ | 30/228 |
| 2012/0011729 A1 * | 1/2012 | Kim et al. | .......................... | 30/228 |
| 2012/0246942 A1 * | 10/2012 | Nie et al. | ........................... | 30/247 |
| 2013/0000130 A1 * | 1/2013 | Maniwa | ............................ | 30/228 |

* cited by examiner

*Primary Examiner* — Omar Flores Sanchez
(74) *Attorney, Agent, or Firm* — Egbert Law Offices, PLLC

(57) ABSTRACT

A trigger-operated portable electric tool for performing a main function, characterized in that it has a double trigger with, on the one hand, a main trigger for operating it, which operates at least one moving active part of the tool and, on the other hand, an auxiliary trigger or secondary trigger connected to the main trigger by means of an articulation and configured to make an angle with the said main trigger, the pivoting of the auxiliary trigger about the articulation enabling actuation of a means of operating a system for performing at least one additional function of the tool.

8 Claims, 6 Drawing Sheets

TRIGGER-OPERATED PORTABLE ELECTRIC TOOL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention applies to trigger-operated portable electric tools. More specifically, it concerns the field of portable electric tools that are controlled during use by a trigger activated by at least one finger of the hand holding said tools. By pressing on this trigger, a command is given to an actuator (often consisting of an electric motor) to activate the element or moving active elements of the tool in a given direction; by letting go of said trigger, a command is given to the actuator either to stop (for tools operating in a single direction) or to activate the element or moving active elements of the tool in the opposite direction (for tools operating in two directions).

2. Description of Related Art Including Information Disclosed Under 37 CFR 1.97 and 37 CFR 1.98.

Motorized pruning shears, especially electric and electronic pruning shears, are examples of contemporary tools having a bidirectional control trigger (opening and closing the cutting elements).

The applications of the invention described below apply especially to electronic pruning shears, but it is important to note that the invention can also be applied to other types of motorized pruning shears and to other types of trigger-operated tools, such as shears, drills, grinders, planes, and so on.

In their most advanced versions, such tools are provided, in addition to their principal function, with at least one additional function. This second function consists of, for example, in the ability to maintain an intermediary speed or position, or to reverse the direction of the motor, or to place the tool on standby.

This second function is controlled by the addition of a control device distinct and separate from the trigger, such as a pushbutton, a switch, and so on, positioned on the body of the tool, this device being intended to be activated by a finger other than the one that acts on said trigger.

However, this situation has the disadvantage of being uncomfortable for the user when operating the tool, for the user must either employ two fingers from one hand at the same time or, if the distance between these two control elements is too great, use his other hand, which results in a loss of time.

For example, many pruning shear models, in addition to the function of opening and closing the cutting elements controlled by a trigger activated by the user's finger, are equipped with a second function performed by an electrical or electronic system that can be used to arrest the rotation of the moving blade in a predetermined position intermediate between the closed position and the fully open position, thereby providing the ability to limit the opening of the blades, which is desirable in certain situations, for example, when cutting kindling wood, or when pruning, in order to save time and energy. This second function is controlled by a switch that is independent of the control trigger and must be activated by a finger other than the one used to activate said control trigger, and this must occur each time the operator wishes to go from the "fully open" position to the "intermediate" position and vice versa.

The transition from one position to another being frequent due to the varying thicknesses of wood being cut on the same plant, it is easy to imagine the inconvenience and loss of time occasioned by such a device.

An object of the invention is to correct the aforementioned drawbacks and inadequacies of portable electric tools, especially electric pruning shears.

BRIEF SUMMARY OF THE INVENTION

According to the invention, this objective is achieved by means of a portable electric tool configured to fulfill a primary function notable in that it has a double trigger having, on the one hand, a main actuator-control trigger effecting the movements of at least one moving active element of said tool and, on the other hand, an auxiliary, or secondary, trigger connected to said main trigger by means of an articulation and arranged so as to form a reentrant angle with said main trigger, wherein pivoting said auxiliary trigger activates control means of a system designed to fulfill at least one supplementary function of said tool.

It is apparent that this double-trigger device can be used to control several tool functions with a single finger, which provides comfort and saves time.

According to a preferred embodiment applicable to portable electric tools comprising a cutting head having at least one moving blade whose movements are controlled by an electronic control card, this latter is configured to control the complete opening of the "fully opened" blades or the stable positioning of said moving blade(s) in a partly opened "intermediate" position, and the auxiliary trigger can be used to act upon a complementary control means of said actuator via said electronic control card.

By means of this arrangement, the blades of cutting tools such as electronic pruning shears can be stably positioned in a partly open "intermediate" position that allows for better adaptation of the opening of the cutting blades to the diameter of the wood (branches, vine shoots, etc.) being cut, which results in significant savings of energy and time, together with improved ease of use and greater precision.

It is possible to proceed instantaneously from a predetermined partly open "intermediate" position to the "fully open" position and vice versa. The width of the intermediate angle of opening can be adjustable.

According to a highly preferred embodiment, a sensor, preferably having a Hall-effect or magnetoresistive sensor, is fixedly arranged on the body of the tool, and the free end of the auxiliary trigger is equipped with a permanent magnet capable of being brought in proximity with said sensor or away from it.

By means of this embodiment of the supplementary actuator control means, the auxiliary trigger of the double trigger does not make contact with any mechanical element. Therefore, there is no mechanical wear of this control means, which provides longer operating life for the latter over time.

BRIEF DESCRIPTION OF THE DRAWINGS

The preceding objectives, characteristics, and advantages, as well as others, can be better appreciated by means of the description that follows and the attached drawings in which.

DETAILED DESCRIPTION OF THE INVENTION

Figure 1:
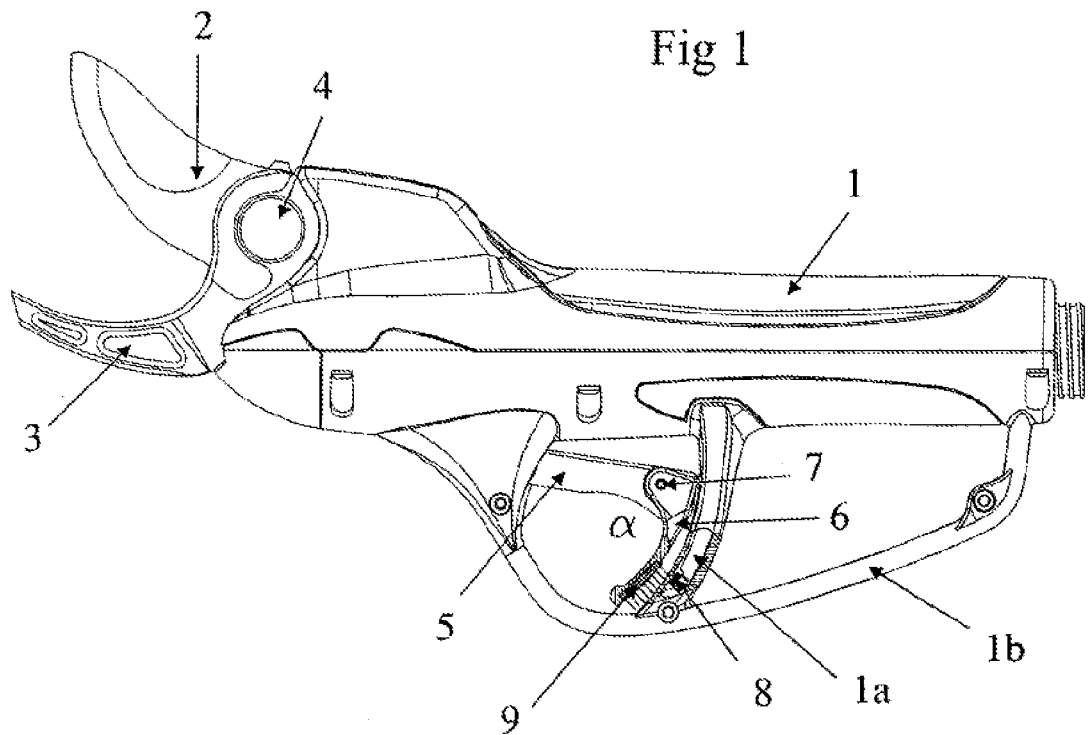
FIG. 1 is a side elevation view of a portable electric tool according to the invention, which, according to the example shown, has an electronic pruning shears represented in rest position, wherein the control trigger and the auxiliary trigger are not activated.

We refer to the said drawings to describe an interesting, but in no way limiting, embodiment of a portable electric tool according to the invention, which, in this highly advantageous example, comprises an electronic pruning shears whose cutting head has a moving blade and a fixed blade.

A tool of this type comprises, in a method known per se, a body 1 shaped to serve as a handgrip, to one of whose extremities is affixed a fixed counterblade 3 and a moving blade 2 joined to this counterblade by means of an axis 4 and which pivots by means of an actuator (not shown) generally comprising an electric motor. A control trigger accessible on the body of the tool can be used to control tool operation via an electronic control card whenever the tool is an electronic pruning shears.

It is known that such portable electric tools are powered by means of a battery carried by the user and installed in a housing that may also house the electronic control card for the moving blade actuator.

According to the invention, portable electric tools designed to carry out a principal function, for example, cutting wood whose diameter may vary between 5 mm and 30 mm (trimming vines, hedges, or fruit trees), have a double trigger having, on the one hand a main actuator-control trigger 5 effecting the movements of at least one active moving element 2 of said tool and, on the other hand, an auxiliary or secondary trigger 6 connected to said main trigger 5 by means of an articulation 7 and arranged so as to form a reentrant angle, α, with said main trigger, the pivoting of said auxiliary trigger 6 enabling activation of control means 8 of a system developed to fulfill at least one supplementary function of said tool.

This supplementary function can be, for example:

maintaining an intermediate rotational speed of the tool of some portable electric devices equipped with a rotary tool;

reversing the rotational direction of this rotary tool; and placing the tool on standby.

According to another suitable characteristic arrangement applicable to portable electric cutting tools, for example, electronic pruning shears comprising a cutting head having at least one moving blade whose movements are controlled by an electronic control card, the latter is configured to control either the complete opening of the "fully open" blades or the stable positioning of said moving blade(s) in a partly open "intermediate" position, and auxiliary trigger 6 of double trigger device 5-6 is arranged so that complementary control means 8 of the actuator of said cutting blade(s) can be acted upon via the electronic control card.

According to a very interesting embodiment, means for controlling activation of the second function of the portable electric tool has sensor 8, preferably a Hall effect or magnetoresistive sensor fixedly arranged on element 1a of body 1 of said tool near double trigger 5-6. On the other hand, the free terminal portion of auxiliary trigger 6 is equipped with permanent magnet 9 oriented in the direction of sensor 8.

Magnet 9 is elongated and its length is such that it can be brought close to and facing sensor 8 by pivoting auxiliary trigger 6 regardless of the position of main trigger 5 (rest position or control position), which in effect participates in the positioning of said auxiliary trigger 6.

Obviously, auxiliary trigger 6 could be used to activate other control means for the activation of a second function of portable electric tools, such as, for example: a pushbutton, switch, and so on, which can send a signal to the electronic control card.

Advantageously, the control means (sensor 8, pushbutton, switch, etc.) is fixedly mounted on connecting part 1a rigidly connecting body 1 and protective guard 1b of the tool, which has the advantage of reinforcing this guard and making the tool more comfortable to use, especially by preventing the tool from recoiling in the hand when working above ground.

Figure 2:
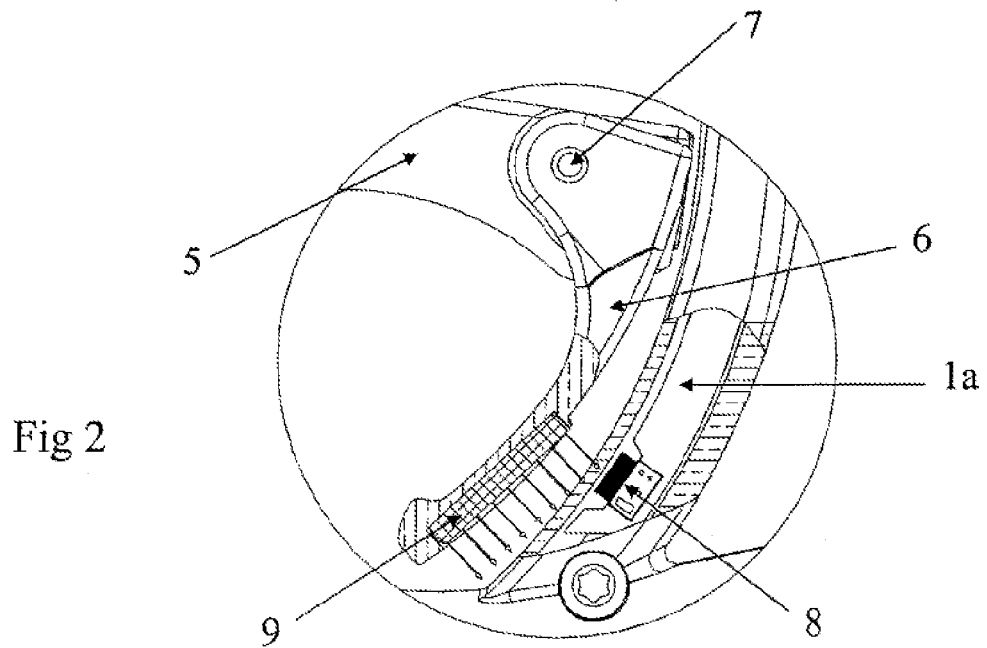
FIG. 2 is an isolated view at a greater scale of the double-trigger device.

Whenever main control trigger 5 is released, cutting blades 2, 3 are found in the fully open position, and the end portion of the supplementary blade is not in proximity of sensor 8, so that magnet 9 is not detected by the latter (FIGS. 1 and 2).

Figure 9:
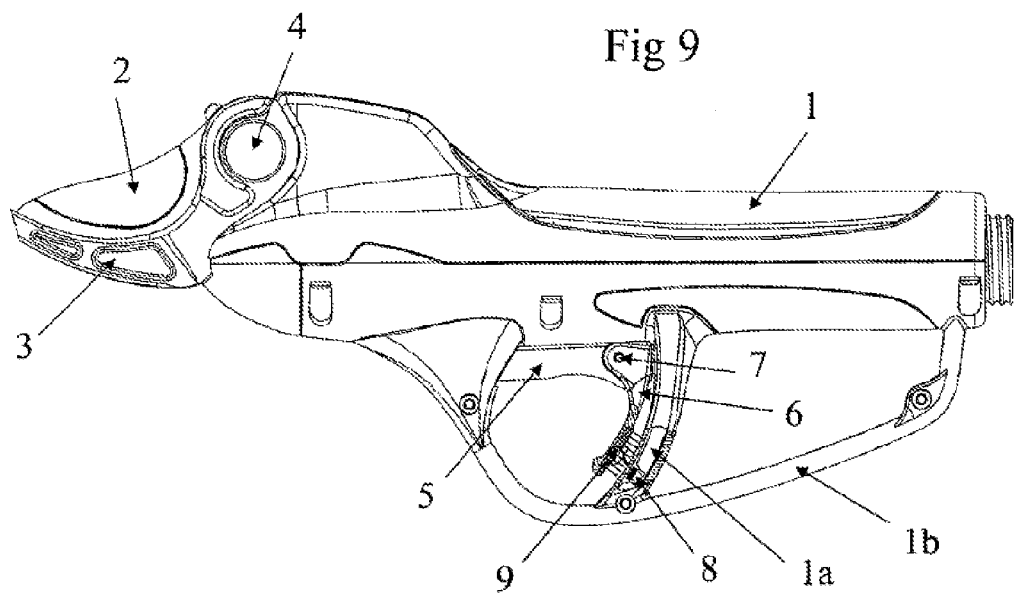
FIGS. 9 and 10 are similar to the views in FIGS. 1 and 2 respectively, the control trigger being activated to cause the closure of the cutting blades while the auxiliary trigger is not activated.
Figure 10:
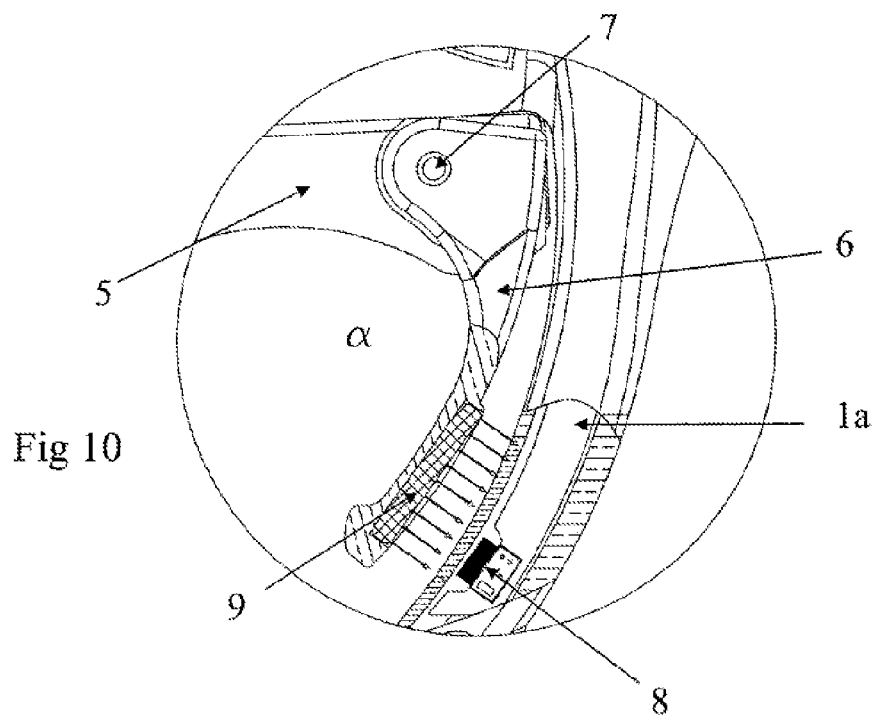

The same occurs whenever pressure is applied to main trigger 5 to activate the primary function for which the portable electric tool has been designed (FIGS. 9 and 10).

If auxiliary trigger 6 is activated, the Hall effect or magnetoresistive sensor 8 detects magnet 9 and sends a signal to the electronic control card to direct it to implement at least a second function of the tool.

Figure 3:
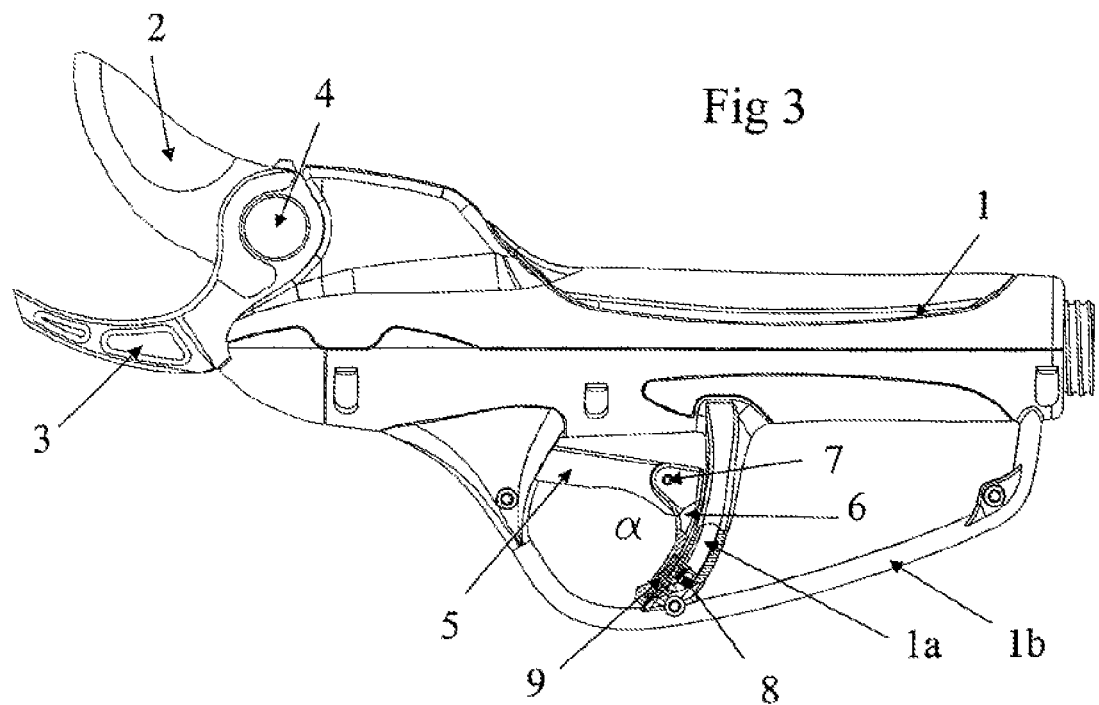
FIGS. 3 and 4 are similar to the views in FIGS. 1 and 2 respectively, the auxiliary trigger being shown in activating position.
Figure 4:
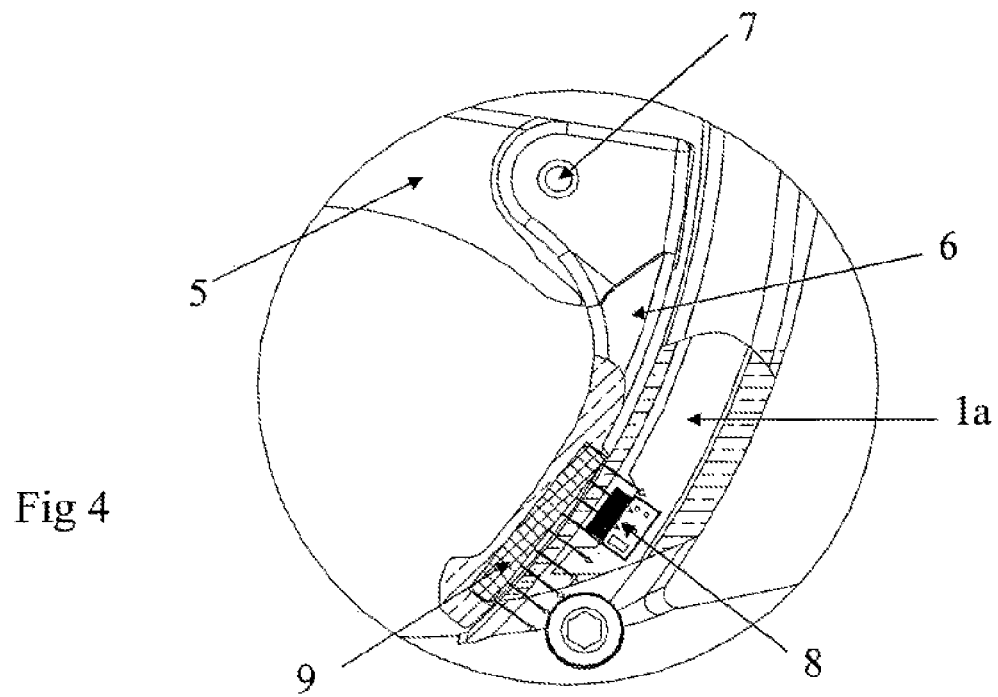
Figure 5:
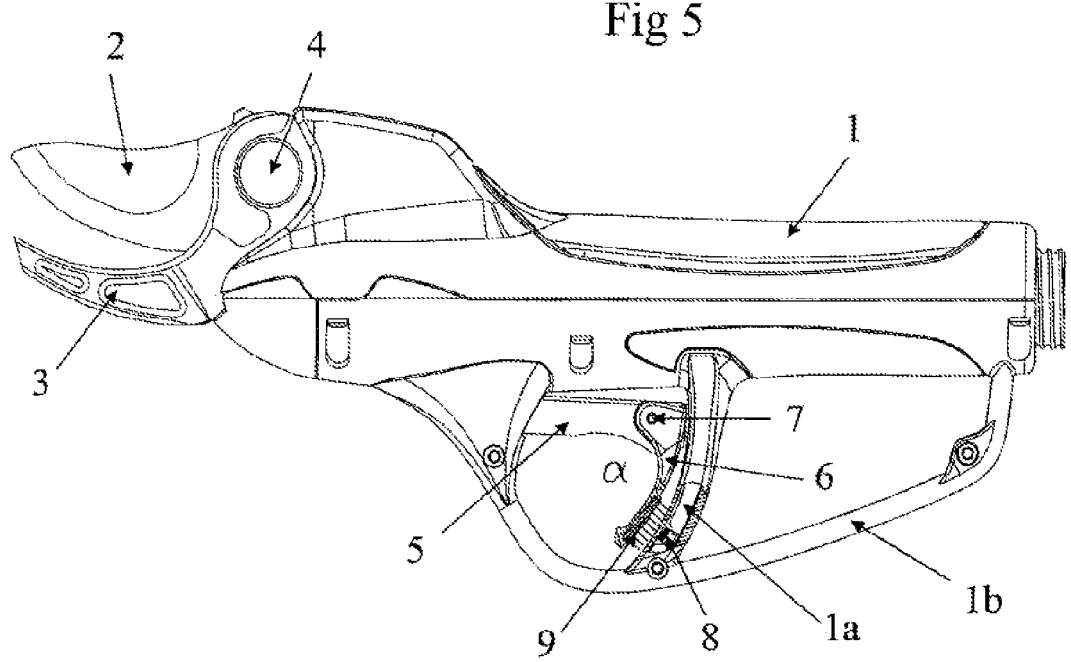
FIGS. 5 and 6 are similar to the views in FIGS. 1 and 2 respectively and illustrate the blades in the partly open "intermediate" position, wherein the control trigger and the auxiliary trigger are not activated.
Figure 6:
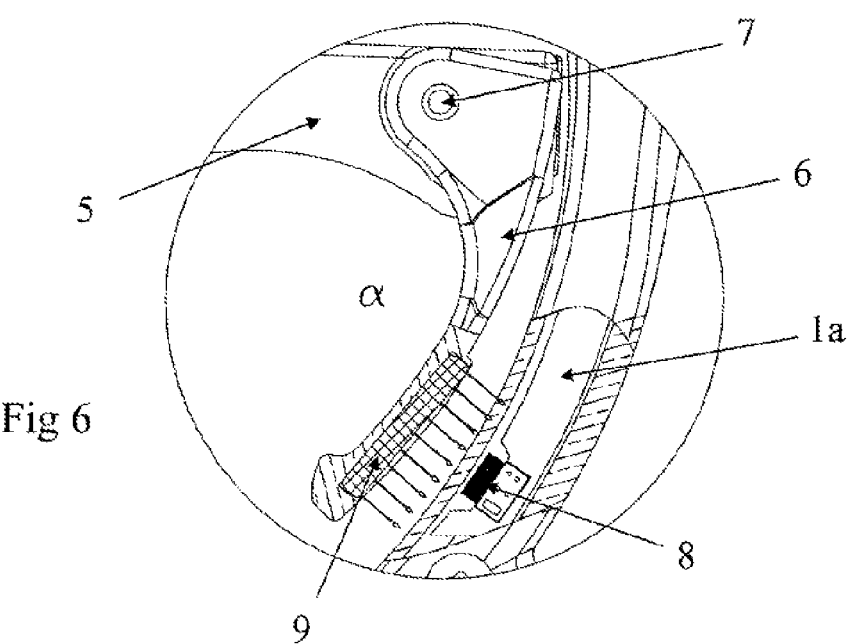

For example, when putting the tool in standby position, main trigger 5 having been released (FIGS. 1 and 2) or activated (FIGS. 5 and 6) by applying pressure to auxiliary trigger 6 (FIGS. 3 and 4), the tool is thereby stopped until pressure is again intentionally applied to the main control trigger to return it to operation.

Figure 7:
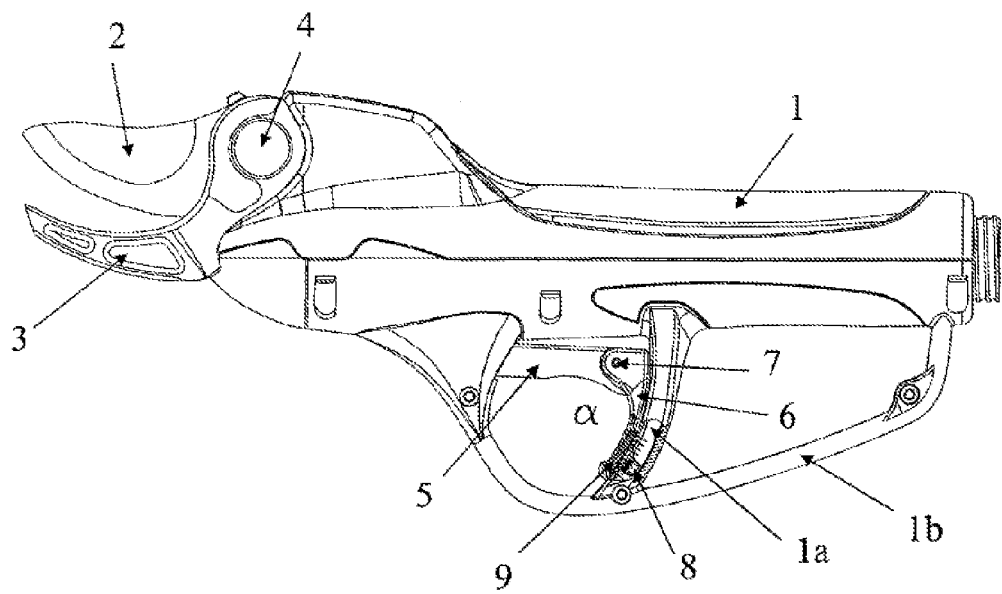
FIGS. 7 and 8 are similar to the views in FIGS. 5 and 6 respectively, the control trigger not being activated while the auxiliary trigger is pivoted into activating position.
Figure 8:
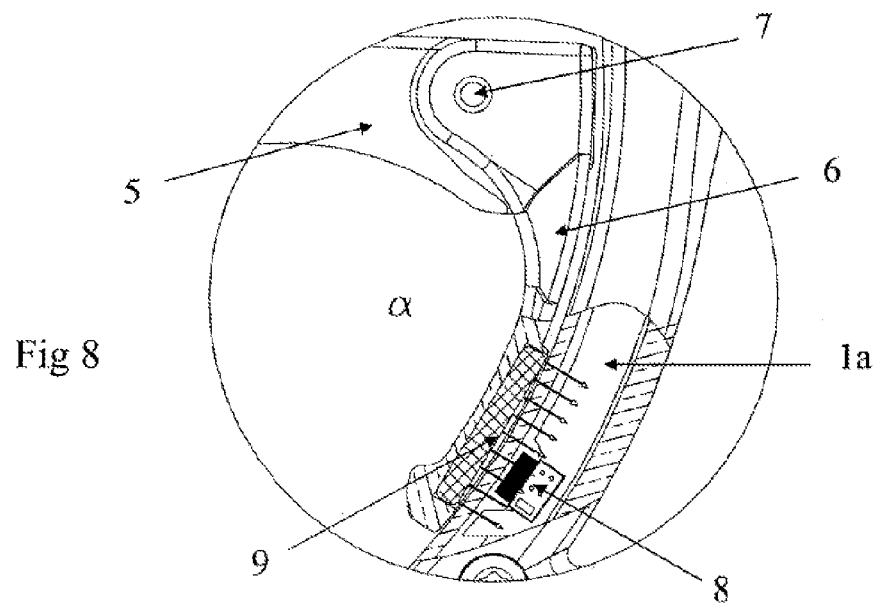
Figure 11:
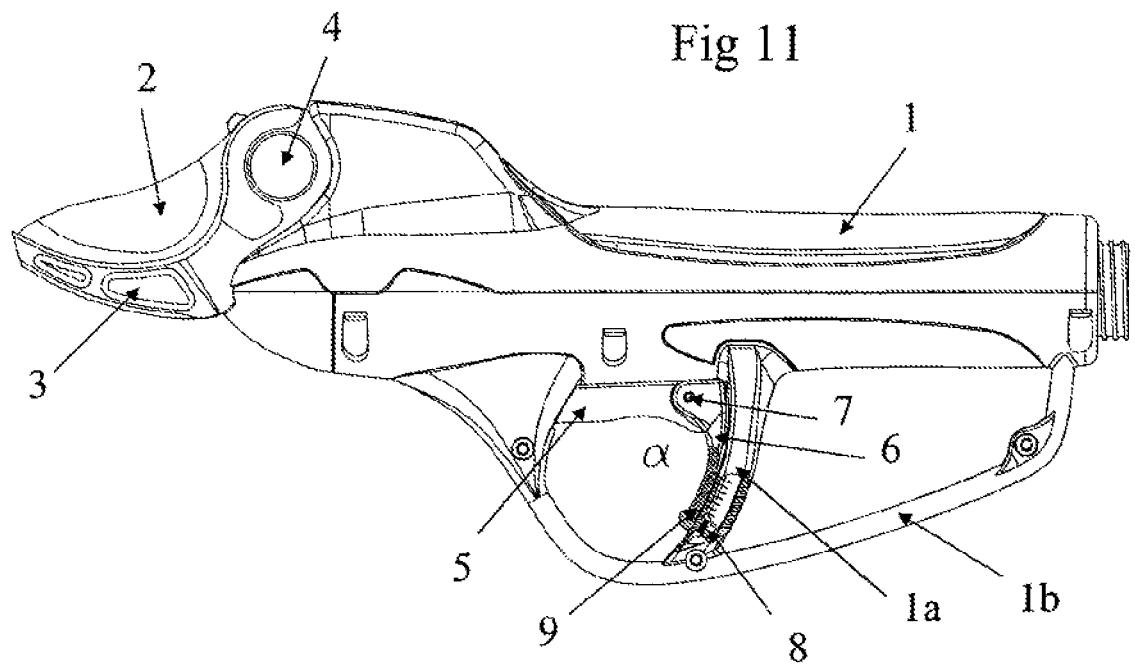
FIGS. 11 and 12 are similar to the views in FIGS. 9 and 10 respectively, the auxiliary trigger being represented in activating position.
Figure 12:
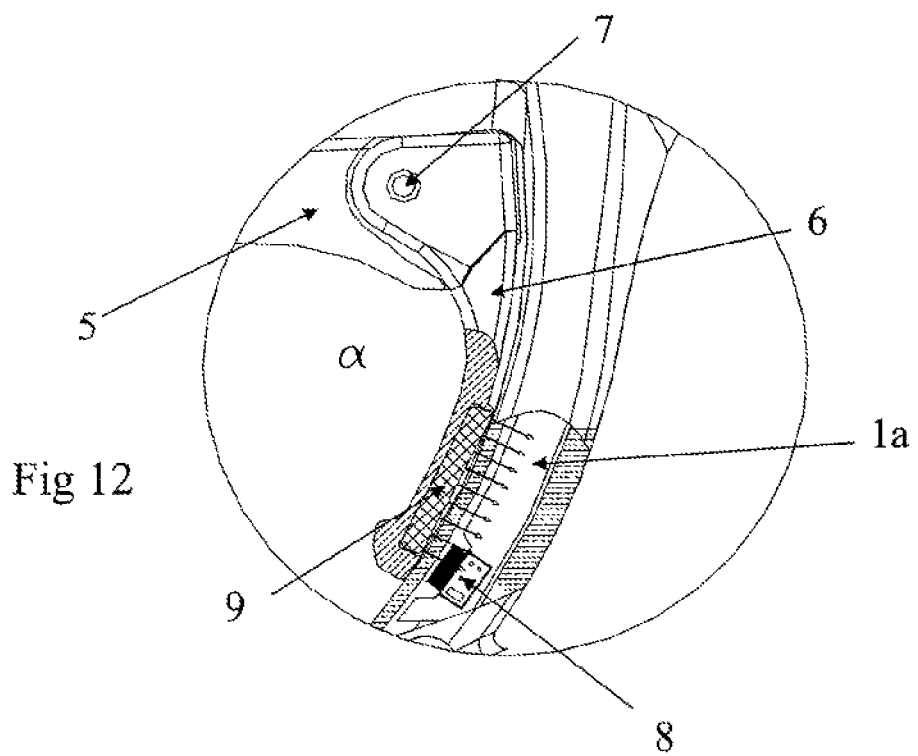

As indicated above, magnet 9 is of sufficient length to be detected by the Hall effect or magnetoresistive sensor 8 in any position of main trigger 5: open blades (FIGS. 3, 4), moving blade stopped in partly open position (FIGS. 7, 8), blades closed (FIGS. 11, 12).

The example shown in the drawing illustrates the possibility of stably positioning moving blade 2 in a partly open "intermediate" position. To that end, the electronic control card is configured and programmed to direct the actuator to allow only partial opening of said moving blade 3 whenever pressure on main trigger 5 is relaxed, in order to save time when carrying out the work of cutting kindling wood, given the shorter path of the moving blade.

The electronic control card can be configured so that when the tool cutting head operates in an "intermediate open" position:

by applying pressure to auxiliary trigger 6, the electronic control card ensures that the tool is returned to normal operation with the cutting blades "fully open";

by maintaining pressure on auxiliary trigger 6 while activating main control trigger 5, moving blade 2 is fully opened; and by releasing auxiliary trigger 6, the electronic control card sends the command to return to "intermediate open" operating mode.

I claim:

1. A portable electric tool apparatus having a primary function and a secondary function, the portable electric tool apparatus comprising:

a tool body having at least one active element;

a main trigger movable in relation to said tool body;

an actuator positioned in said tool body and cooperative with said main trigger, said actuator suitable for effecting a movement of the active element when said main trigger is moved;

an auxiliary trigger having an articulated connection to said main trigger so as to form an angle with respect to said main trigger such that a position of said auxiliary trigger is dependent upon a position of said main trigger; and a controller suitable for effecting the secondary function, said auxiliary trigger pivotable about said articulated connection so as to activate said controller.

2. The portable electric tool apparatus of claim 1, said tool body having at least one movable blade and a fixed blade, the movable blade being said active element, said controller being an electronic control card, said electronic control card suitable for causing a complete opening of said movable blade with respect to said fixed blade or a partially open position of said movable blade with respect to said fixed blade, said auxiliary trigger having a complementary element cooperative with said electronic control card.

3. The portable electric tool apparatus of claim 2, said controller comprising a Hall effect sensor fixed on said tool body, said auxiliary trigger having a permanent magnet cooperative with said Hall effect sensor.

4. The portable electric tool apparatus of claim 2, said controller comprising a magnetoresistive sensor fixed on said tool body, said auxiliary trigger having a permanent magnet cooperative with said magnetoresistive sensor.

5. The portable electric tool apparatus of claim 3, said permanent magnet having an elongated shape so as to be movable in proximity to and facing said Hall effect sensor by pivoting said auxiliary trigger regardless of a position of said main trigger.

6. The portable electric tool apparatus of claim 1, said controller comprising a switch that is activated by said auxiliary trigger.

7. The portable electric tool apparatus of claim 1, said controller comprising a push button activated by said auxiliary trigger.

8. The portable electric tool apparatus of claim 1, said controller being fixedly mounted on a connecting piece that rigidly connects a protective guard to said tool body.

* * * * *